Patented Oct. 6, 1942

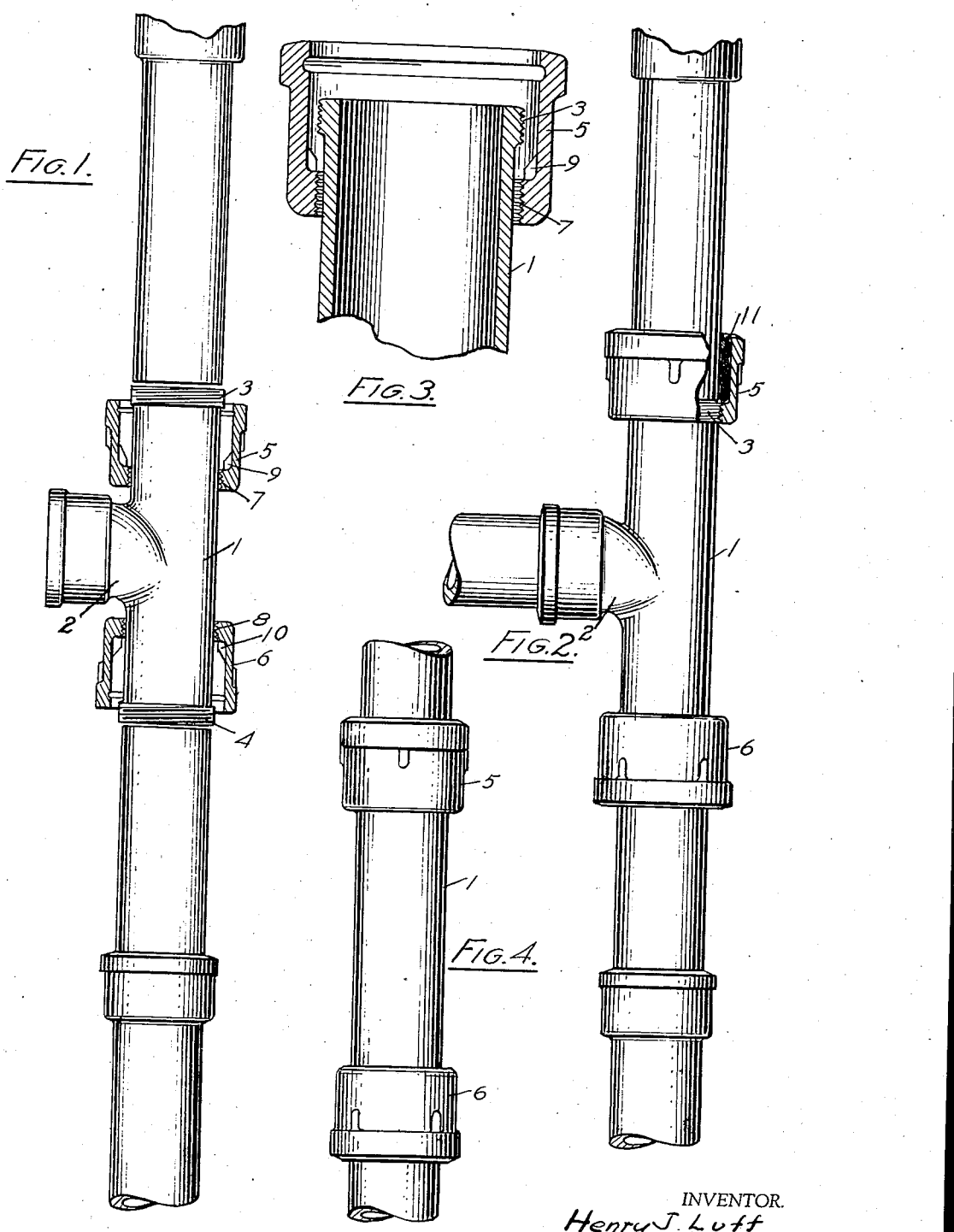

2,297,966

UNITED STATES PATENT OFFICE 2,297,966

INSERTABLE JOINT

Henry J. Luff, Cleveland, Ohio, assignor to J. A. Zurn Manufacturing Company, Erie, Pa., a corporation of Pennsylvania Application June 13, 1940, Serial No. 340,311

4 Claims. (Cl. 285—116)

This invention relates generally to pipe fittings and more particularly to insert fittings with accuracy of alignment.

In all insert fittings made according to the prior art and with which I am familiar, it was necessary to cut off two regular size pipes where an insert must be made. The use of two pipes as well as the labor costs for cutting these two pipes made this a very costly procedure and besides this, the insert was very inaccurate in alignment. Much time was required for this work. Time is of the essence in the insertion of the fittings because they are usually placed in fixed and existing installations.

It is the object of the present invention to overcome the above and other defects in insert fittings and more particularly to provide an insert fitting which is easy to install, cheap in cost, efficient in operation, and economical in manufacture.

Another object of my invention is to provide insert fittings with Y and T branches.

Another object of my invention is to provide means for centering the spigot end of a pipe in a hub.

Other objects of my invention will become evident from the following detailed description taken in conjunction with the following drawing, in which—

Fig. 1 is a side elevational view of a pipe line with applicant's novel insert fitting therein, the hubs of the insert fitting being shown in cross section.

Fig. 2 is a side elevational view with parts broken away of a pipe line with an insert fitting therein after the hubs are caulked.

Fig. 3 is an enlarged sectional view of the end of an insert fitting and hub.

Fig. 4 is an elevational view of a portion of a pipe line showing the fitting therein.

Referring to the drawing, Fig. 1 shows an insert fitting 1, having a T-branch 2. The ends of the insert fitting are threaded at 3 and 4, hubs 5 and 6 having threaded portions 7 and 8 are disposed at opposite ends of the insert fittings 1. It will be evident that a T-branch insert fitting, Y-branch insert fitting or plain insert fitting may be used without departing from my invention. It is necessary that the hubs 5 and 6 of the fitting move lengthwise along the fitting to a position shown in Fig. 1 wherein the outer ends thereof clear the ends of the fitting 1 in order that the fitting may be inserted in a pipe line. Raised annular portions 9 and 10 are disposed in the interior of the hubs 5 and 6 to center the spigot ends of the pipes while they are being engaged to the hubs 5 and 6. This provides a simple means of centering the spigot ends of the pipes in the hubs 5 and 6 and also disposes the opposing pipes in perfect alignment.

In the operation of inserting the insert fitting 1 in a pipe line a length of pipe is cut out of the line equal to the length of the insert fitting. The hubs are disposed as shown in Fig. 1 with the ends thereof clearing the ends of the insert fitting when the insert fitting 1 is inserted in the pipe line. The hubs are then moved longitudinally and the threaded portions 7 and 8 of the hubs 5 and 6 engage the threaded portions 3 and 4 on the insert fitting 1 and are secured to the ends thereof as shown by the broken away portion, Fig. 2. After the hubs 5 and 6 are fixed to the ends of the insert fitting 1 shown in Fig. 2, they are caulked with suitable caulking material 11. This construction makes a very efficient and practical joint.

Various changes may be made in the embodiments of my invention without departing from the spirit thereof or from the scope of the appended claims.

What I claim is:

1. An insert fitting for a pipe line, comprising a cylindrical pipe having threads at both ends thereof; hubs disposed centrally of said pipe, adapted to move longitudinally and outwardly thereon to engage the spigot ends of adjacent pipe lines, said hubs having an inner threaded portion for engagement with the threaded portion of said pipe when said hubs are in engagement with the spigot ends of adjacent pipe lines.

2. An insert fitting for a pipe line comprising a cylindrical pipe having threads at both ends thereof and hubs disposed on opposite ends of said pipe having a threaded portion for engaging with the threaded portions of said pipe, said hubs being movable longitudinally on said pipe so that the ends thereof clear the ends of the pipe.

3. An insert fitting for a pipe line comprising a cylindrical pipe having threads at both ends thereof, hubs disposed on opposite ends of said pipe having a threaded portion for engaging with the threaded portions of said pipe and projecting portions in said hub for centering spigot ends of the engaging pipes.

4. In a pipe line, in combination, an insert fitting having threaded portions on opposite ends thereof, hub members movable longitudinally thereon having threaded portions for engaging threaded portions of said insert fitting and a projecting portion on the interior of said hubs for centering spigot ends of pipes engaging therewith.

HENRY J. LUFF.